(12) United States Patent
Kravitz et al.

(10) Patent No.: US 6,746,496 B1
(45) Date of Patent: Jun. 8, 2004

(54) COMPACT SOLID SOURCE OF HYDROGEN GAS

(75) Inventors: Stanley H. Kravitz, Placitas, NM (US); Andrew M. Hecht, Sandia Park, NM (US); Alan P. Sylwester, Albuquerque, NM (US); Nelson S. Bell, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/191,900

(22) Filed: Jul. 9, 2002

Related U.S. Application Data
(60) Provisional application No. 60/349,015, filed on Jan. 15, 2002.

(51) Int. Cl.[7] .................................................. C10J 3/20
(52) U.S. Cl. ........................... 48/118.5; 48/61; 48/120; 48/174; 422/162; 422/211; 422/234; 422/236; 422/238; 422/240; 423/657; 423/658.2
(58) Field of Search ........................... 48/61, 62 R, 89, 48/118.5, 119, 120, 174, 197 R; 422/162, 211, 234, 236, 238, 240; 423/648.1, 657, 658.2

(56) References Cited

U.S. PATENT DOCUMENTS

| | | | | |
|---|---|---|---|---|
| 3,795,491 A | | 3/1974 | Winiarczyk ................ 23/299 |
| 3,926,844 A | * | 12/1975 | Benczur-Urmossy ....... 502/101 |
| 4,002,726 A | | 1/1977 | Filby ........................ 423/287 |
| 5,182,046 A | | 1/1993 | Patton et al. ........... 252/188.26 |
| 5,372,617 A | * | 12/1994 | Kerrebrock et al. ............ 48/61 |
| 5,593,640 A | * | 1/1997 | Long et al. .................. 422/111 |
| 5,804,329 A | | 9/1998 | Amendola .................... 429/34 |
| 6,231,825 B1 | | 5/2001 | Colby et al. ................ 423/286 |
| 6,358,488 B1 | | 3/2002 | Suda .......................... 423/657 |

OTHER PUBLICATIONS

Di Pietro and Skolnik, "Sodium Hydride–based Hydrogen Storage System", Oct. 29, 1999, pp. 861–888.
http://www.millinniumcell.com/solutions/patent.html, "Keeping the solicon hot and the world cool—that's the challenge Millennium Cell meets", Apr. 22, 2002, 4 pgs.

* cited by examiner

*Primary Examiner*—Glenn Caldarola
*Assistant Examiner*—Basia Ridley
(74) *Attorney, Agent, or Firm*—Robert D. Watson

(57) ABSTRACT

A compact solid source of hydrogen gas, where the gas is generated by contacting water with micro-disperse particles of sodium borohydride in the presence of a catalyst, such as cobalt or ruthenium. The micro-disperse particles can have a substantially uniform diameter of 1–10 microns, and preferably about 3–5 microns. Ruthenium or cobalt catalytic nanoparticles can be incorporated in the micro-disperse particles of sodium borohydride, which allows a rapid and complete reaction to occur without the problems associated with caking and scaling of the surface by the reactant product sodium metaborate. A closed loop water management system can be used to recycle wastewater from a PEM fuel cell to supply water for reacting with the micro-disperse particles of sodium borohydride in a compact hydrogen gas generator. Capillary forces can wick water from a water reservoir into a packed bed of micro-disperse fuel particles, eliminating the need for using an active pump.

10 Claims, 2 Drawing Sheets

COMPACT SOLID SOURCE OF HYDROGEN GAS

CROSS REFERENCE TO RELATED APPLICATIONS

This application claims the benefit of provisional application No. 60/349,015 "A Novel Fuel Approach for Hydrogen Generation from Solids", by Kravitz, et al., filed Jan. 15, 2002, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to methods and materials for the generation of hydrogen gas from solid hydrogen storage materials. In particular, the present invention relates to the generation of hydrogen gas by contacting water with micro-disperse particles of sodium borohydride in the presence of a catalyst, such as cobalt or ruthenium.

Hydrogen gas is used as a fuel for fuel cells, as a purge gas in chromatographs, and for combustors. Micro fuel cells, micro gas chromatographs (i.e., micro chem labs-on-a-chip), and micro-combustors all require a compact, high-density, controllable source of hydrogen gas. Gas cylinders are too heavy and bulky, while liquid hydrogen requires cyrogenic cooling. Metal hydride systems are limited to 1–3% hydrogen by weight; are endothermic (that is, as hydrogen is evolved, the container gets colder, which reduces the hydrogen vapor pressure); the hydrogen evolution rate is not controllable or adjustable (so that an oversized amount of hydride is necessary); and the metal hydrides are quite expensive.

Micropower is the key to making integrated microsystems. When a compact hydrogen source is developed to compliment a micro fuel cell, or feed a gas chromatograph, a total system package will be available for making power or purge gas, that currently is provided by large batteries or large gas cylinders.

Metal hydrogen complexes, such as sodium borohydride ($NaBH_4$), zinc borohydride ($ZnBH_4$), potassium borohydride ($KBH_4$), calcium borohydride ($CaBH_4$), lithium aluminum hydride ($LiAlH_4$), sodium boron trimethoxy hydride ($NaBH(OCH_3)_3$), and so on, are attractive solid sources of hydrogen. When reacted with water, in the presence of a suitable catalyst, these metal hydrogen complexes can provide a hydrogen gas yield from 11–14% by weight (which is 5–6 times more hydrogen released per gram than for metal hydrides).

Sodium borohydride (also known as sodium tetrahydridoborate) is a particularly attractive solid source of hydrogen since its equivalent energy density is nearly equal to that of diesel fuel. It is commonly used in a variety of industrial processes (e.g., as a bleaching agent in paper and newsprint production and recycling). As an extremely powerful reducing agent, it is also used to reduce impurities in the chemicals processing industry, and to reduce metals from industrial waste streams and effluents (e.g., recovering copper from printed circuit board wastewater).

Sodium borohydride reacts exothermically with water in the presence of a catalyst (or when acidified) to produce hydrogen gas and sodium metaborate (i.e., Borax) according to the following reaction:

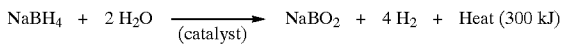

$$NaBH_4 + 2 H_2O \xrightarrow{\text{(catalyst)}} NaBO_2 + 4 H_2 + \text{Heat (300 kJ)} \quad (1)$$

This reaction is particularly efficient at generating hydrogen gas, since the sodium borohydride supplies two of the hydrogen gas molecules ($H_2$), and the water supplies the other two molecules, for a total of four molecules of $H_2$. The reaction is exothermic; does not require the addition of heat or the use of high pressure to initiate; and can generate hydrogen even at 0 degrees C.

Solid sodium borohydride is a particularly attractive choice as a compact and high-density source of hydrogen fuel for fueling a Proton Exchange Membrane (PEM) hydrogen/oxygen fuel cell (i.e., PEM fuel cell).

Dry sodium borohydride is conventionally produced as a powder (i.e., particles) having particle sizes in the range of 100–600 microns. An anti-caking/flow agent additive is typically added immediately after removal of the borohydride powder from a vacuum dryer to promote free-flow of the powder (unless the dried powder is immediately compacted into a compacted product form). See U.S. Pat. No. 5,182,046 to Patton, et al.). Examples of compacted product forms include 25 mm diameter ×6 mm pellets, 5×11×17 mm caplets, and granules. A typical anti-caking-agent comprises 0.5% by weight of silica or magnesium carbonate nanoparticles. Here, the word "caking" means the uncontrolled agglomeration and/or aggregation of individual fuel particles into a larger mass (i.e., "cake").

Alternatively, a fluidized bed dryer can be used instead of a vacuum dryer, which produces free-flowing particles of solid sodium borohydride without the need for using anti-caking or flow additives. See U.S. Pat. No. 6,231,825 to Colby, et al. This is because the fluidized bed process produces particles having a significantly larger average particle size (600 microns), as compared to the average size of vacuum dried particles (100–200 microns). Sodium borohydride is produced commercially by Morton and Eagle-Picher in the USA; by Finnish Chemicals (Nokia) in Finland; and Bayer in Germany.

Adding water to commercially available powders, granules, caplets, or pellets of solid sodium borohydride (in the presence of a suitable catalyst, such as cobalt or ruthenium) results in caking and scaling of the borohydride surface due to production of the reactant product sodium metaborate ($NaBO_2$) in the form of a surface layer (i.e., crust or scale). As the layer of scale grows progressively thicker, the water has a progressively harder time penetrating through the metaborate crust to reach the unreacted $NaBH_4$ fuel below, resulting in a decreased hydrogen production rate (it can even stop producing gas if the scale is thick enough). Note that this is a different phenomenon than the previous problem of "caking" caused by agglomeration of fine powders that occurs during production (that was described earlier).

The problem of scale/crust formation during hydrogen generation can be prevented by using a dilute aqueous solution of $NaBH_4$. In this well-known approach, sodium borohydride powder is dissolved into water stabilized with 1–10% NaOH or KOH. The alkaline state of the solution prevents the dissolved sodium borohydride from decomposing and prematurely releasing hydrogen gas. The solubility limit of sodium borohydride in water at room temperature is 44 wt % (and decreases at lower temperatures). An example of a commercially available stabilized aqueous solution called VenPure® is available from Rohm and Haas, Inc. that comprises 12% $NaBH_4$, 40% NaOH, and the balance water.

When using a dilute aqueous solution of $NaBH_4$, hydrogen gas is generated by contacting the solution with a metal catalyst. For example, in U.S. Pat. No. 6,3587,488 (which is herein incorporated by reference), Suda discloses a method of generating hydrogen gas by adding small amounts of powdered catalysts, such as cobalt, nickel, or $Mg_2Ni$ (fluorinated or unfluorinated) to a stabilized, alkaline solution containing 10% sodium borohydride.

Likewise, the Hydrogen-on-Demand™ system from Millennium Cell, Inc. uses a liquid fuel source comprising a 20–30% aqueous solution of $NaBH_4$ stabilized with 1–3% NaOH. In their system, a fuel pump and valves directs liquid fuel from a storage tank containing 20–30% sodium borohydride solution into a catalyst chamber (e.g., ruthenium sponge metal). Upon contacting the catalyst bed, the fuel solution generates hydrogen gas and sodium metaborate (in solution). The hydrogen gas and metaborate solution are separated in a second chamber, and the metaborate solution is stored as a waste product in a collection tank. The heat generated during the reaction is sufficient to vaporize some of the water present. As a result, the hydrogen gas is supplied at 100% relative humidity to the PEM fuel cell. The hydrogen gas can be optionally processed through a heat exchanger to achieve a specified level of humidity before being sent to the PEM fuel cell for consumption. This Hydrogen-on-Demand™ system has been successfully demonstrated to electrically power a Chrysler Town & Country Minivan.

Disadvantages of this approach include the relatively low energy density of the diluted liquid fuel (e.g., 10–30% $NaBH_4$), which makes it only slightly better than metal hydrides. Additionally, a pump is required for circulating the liquid fuel, which causes a parasitic drain on the net power production from the fuel cell.

These disadvantages become particularly severe if liquid sodium borohydride is used for micro-sized PEM fuel cells, where the goal is to miniaturize every component in the system, while retaining high efficiency of fuel usage and power generation. The system requirements for a micro fuel cell or a micro gas chromatograph are considerably different than for a Minivan.

What is needed, therefore, is a material and system for generating hydrogen gas that utilizes solid sodium borohydride in a highly efficient manner that prevents caking and scaling from reducing the hydrogen production yield, and preferably, without using a fuel pump.

Such a device should provide 5–6 times more hydrogen than existing sources, with the additional possibilities of integration with silicon devices for sensing, control, and MEMS functions. This device should be able to be directly integrated with micro fuel cell designs to create a very compact micro power system. This device should also be scalable to larger systems needing larger amounts of hydrogen for higher power applications.

Against this background, the present invention was developed.

BRIEF DESCRIPTION OF THE DRAWINGS

The accompanying drawings, which are incorporated in and form part of the specification, illustrate various examples of the present invention and, together with the detailed description, serve to explain the principles of the invention.

SUMMARY OF THE INVENTION

Figure 1:
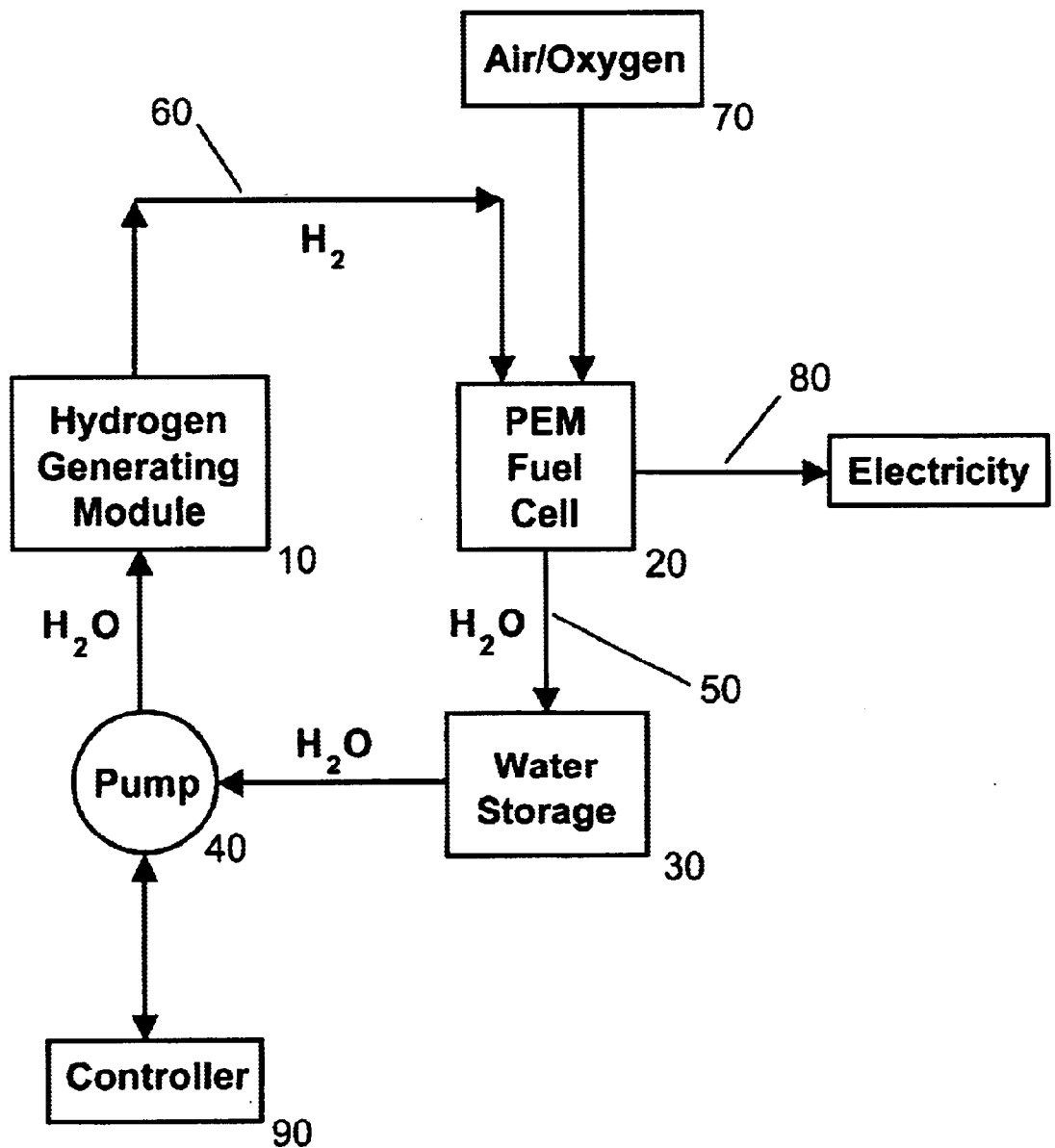
FIG. 1 shows a schematic block diagram of a system for producing electricity using a PEM fuel cell, including a closed loop wastewater management system, according to the present invention.

The present invention relates to the generation of hydrogen gas by contacting water with micro-disperse particles of sodium borohydride in the presence of a catalyst, such as cobalt or ruthenium. The micro-disperse particles can have a substantially uniform diameter in the range of about 1–10 microns, and preferably about 3–5 microns. Ruthenium or cobalt catalytic nanoparticles can be incorporated in the micro-disperse particles of sodium borohydride, which allows a rapid and complete reaction to occur without the problems associated with caking and scaling of the surface by the reactant product sodium metaborate. A closed loop water management system can be used to recycle wastewater from a PEM fuel cell to supply water for reacting with the micro-disperse particles of sodium borohydride in a compact hydrogen gas generator. Capillary forces can wick water from a water reservoir into a packed bed of micro-disperse fuel particles, eliminating the need for using an active pump.

DETAILED DESCRIPTION OF THE INVENTION

The present invention solves the problem of crust formation (i.e., caking, scaling) of the surface of solid sodium borohydride particles, granules, caplets, or pellets from the reaction product sodium metaborate (i.e., borax) during hydrogen production by using micro-disperse particles of solid sodium borohydride. The micro-disperse particles can be in the form of microspheres having a substantially uniform diameter less than 100 microns. Alternatively, the micro-disperse particles can have a substantially uniform diameter in the range of about 1–10 microns, and preferably 3–5 microns. The phrase "micro-disperse" means that the fuel particles are in the 1–100 micron size range, and are non-agglomerated (i.e., dispersed).

The fuel particles can be packed in a simple cubic pattern. About 52% of the volume would be solid, with the other 48% being empty space (i.e., interstices or pores). These interstices allow water, either in the form of liquid water, a fine mist of water, or water vapor, to flow through and make intimate contact the with surfaces of the $NaBH_4$ microspheres. Because about ½ of the total volume is in the form of substantially-interconnected porosity, the water can easily flow between the micro-disperse particles. The micron-sized particles have a very large effective surface area (per unit volume) available for reacting with the water.

By using micro-disperse fuel particles, the water only has to diffuse through a very thin layer of sodium metaborate to totally react each fuel particle to completion. Such a thin layer of crust should be permeable to water. In this sense, the diameter of the fuel particle can be chosen to be smaller than a threshold diameter where formation of a sodium metaborate crust would significantly reduce the hydrogen production rate for particles that have a diameter greater than this threshold diameter. The meaning of a significant reduction in the hydrogen production rate can be defined as a loss greater than 20%. Therefore, this approach significantly reduces, and likely eliminates, the problem of reduced hydrogen production yield caused by caking and scaling.

The metal catalyst can be incorporated into each fuel particle of micro-disperse sodium borohydride. By "incorporated", we mean that the metal catalyst can disposed in the center of the particle (i.e., as a "seed"), or dispersed throughout the bulk of the particle (either uniformly or non-uniformly), or placed as a coating on the surface of the particle, or any combination thereof. The word "incorporated" also refers to a two-component fuel mixture, where one component is the sodium borohydride particle (without catalyst), and the other component is the metal catalyst nanoparticle; and where the two-components are mechanically mixed together to make the fuel mixture having a catalyst incorporated therein.

The use of the word "microsphere" is defined as including irregularly-shaped, oval-shaped, and oblong-shaped particles, having a characteristic, equivalent "diameter".

Because the gap between individual fuel particles is so small (1–10 microns) in a closely-packed array, fluid capillary forces can pull (i.e., wick) liquid water into, and through, a packed bed of micro-disperse fuel particles. This eliminates the need for using an active pump in micro fuel cells, micro gas chromatographs, etc. All that is required is a valve for controlling the follow of water to the bed of fuel particles.

The micro-disperse particles (i.e., crystals) of solid sodium borohydride can be produced a variety of ways. One method is to dissolve the sodium borohydride in Diethylene Glycol Dimethyl Ether (diglyme) at elevated temperature. Above 80 C the sodium borohydride is soluble in diglyme. Micron-sized, mono-disperse particles of sodium borohydride can subsequently be re-precipitated by rapidly cooling the heated, solubilized solution. This can be accomplished, for example, by using a nozzle to spray the solubilized solution into a room temperature bath of diglyme. Optionally, a nucleating agent can be added to help nucleate the particles. In particular, the nucleating agent can be a suitable catalytic metal, such as cobalt, ruthenium, nickel, etc, as is well-know to those of ordinary skill in the art. In this way, a small amount of catalyst is incorporated into each micro-disperse fuel particle. Then, the re-precipitated micro-disperse particles can be separated from the cold diglyme solution by using vacuum filtration with, for example, a 0.5 micron filter.

In general, processing should be performed in an inert environment (e.g., under nitrogen gas, or using a nitrogen gas bubbler), using non-metallic reactors, stirrers, etc. (e.g., glass, Teflon), to prevent any possible catalytic reaction with metal impurities that could lead to uncontrolled generation of hydrogen gas, causing a safety issue.

If agglomeration of these micron-sized particles becomes a problem, then nanoparticles of silica or magnesium carbonate can be added to prevent agglomeration.

Optionally, the catalytic agent can be added as a surface component to the micro-disperse fuel particle at a later date. Alternatively, the catalyst can be mixed in the form of small particles along with the micro-disperse particles of sodium borohydride to form a two-component mixture. Ruthenium nanoparticles can be used for the catalyst. The cobalt catalyst can be derived from cobalt chloride. The ruthenium catalyst nanoparticles can be suspended in alcohol, and then mixed with the re-precipitated solution of sodium borohydride in diglyme to coat the surface of the fuel particles ($NBH_4$) with a thin layer of the catalyst.

The micron-sized fuel particles produced by these methods generally exhibit Brownian motion and behave as a colloidal system. Depending on the surface charge state, the particles may (or may not) stick together. A variety of well-known surface treatments (e.g., nanoparticles of silica or magnesium carbonate) can be used to adjust the surface charge to control the degree of sticking (or non-sticking), required for efficient handling of the particles. In general, the micron-sized fuel particles will form a network with high permeability to fluid flow (e.g., liquid water, water vapor) when loaded into a powder bed (i.e., fuel reservoir). Such a porous structure readily allows for the evolution of hydrogen gas during the flow of water. However, the benefit of using a more tightly packed bed needs to weighed against the difficulty of permeating/transporting water through the bed, either by capillary action, or by forced flow. The packed bed needs to be sufficiently porous so that formation of the reactant product sodium metaborate doesn't clog up the bed and choke off water flow. Bubbling of the hydrogen gas as it is produced may help to loosen the bed and keep it sufficiently porous.

If a pump is used, then pumping water vapor instead of liquid water would allow for a smaller, lower power pump to be used because the low viscosity of water vapor makes it easier to pump than liquid water. A pump can be used as part of a control system, i.e., speeding up when higher power production is required, etc.

The combination of micro-disperse particles with water vapor pumping can provide a high efficiency, high yield source of water vapor-saturated hydrogen gas, controlled by a small, efficient gas pump and control system.

FIG. 1 shows a schematic illustration of a power system for producing electricity using a PEM fuel cell, including a closed loop wastewater management system, according to the present invention. The power system comprises a compact hydrogen gas generator 10, comprising a supply of micro-disperse particles of sodium borohydride mixed with a catalyst selected from the group consisting of ruthenium and cobalt; a Proton Exchange Membrane (PEM) fuel cell 20 for combining hydrogen gas supplied by module 10 with oxygen supplied by air to produce electricity and wastewater; a water storage unit 30; a water pump 40; fluid transfer means 50 for carrying water from PEM fuel cell 20 to the water storage unit 30, then to water pump 40, and then to hydrogen generator 10, whereupon the water contacts the supply of micro-disperse particles of sodium borohydride mixed with a catalyst and generates hydrogen gas; gas transfer means 60 for carrying hydrogen gas from hydrogen generator 10 to the PEM fuel cell 20; means 70 for introducing air (i.e., oxygen) to the PEM fuel cell; means 80 for removing electrons from PEM fuel cell 20; and pump controller 90 operatively associated with water pump 40 for controlling its operation.

The example shown in FIG. 1 illustrates a closed loop water management system, which allows a sodium borohydride fuel cell system to have a high energy density. In the borohydride system, one mole of water is required to create two moles of molecular hydrogen. PEM fuel cell 20 produces one mole of water per mole of hydrogen. A sodium borohydride water management system recovers and recycles wastewater from the fuel cell cathode, and stores it. The stored water is then pumped onto solid sodium borohydride that was mixed with a suitable catalyst, such as cobalt. Hydrogen gas is created in module 10, with half originating from the sodium borohydride and the other half from the fuel cell wastewater stream, so that the system is not a net consumer of water. This allows the borohydride to be stored as a solid, with an energy density nearly that of diesel fuel.

Figure 2:
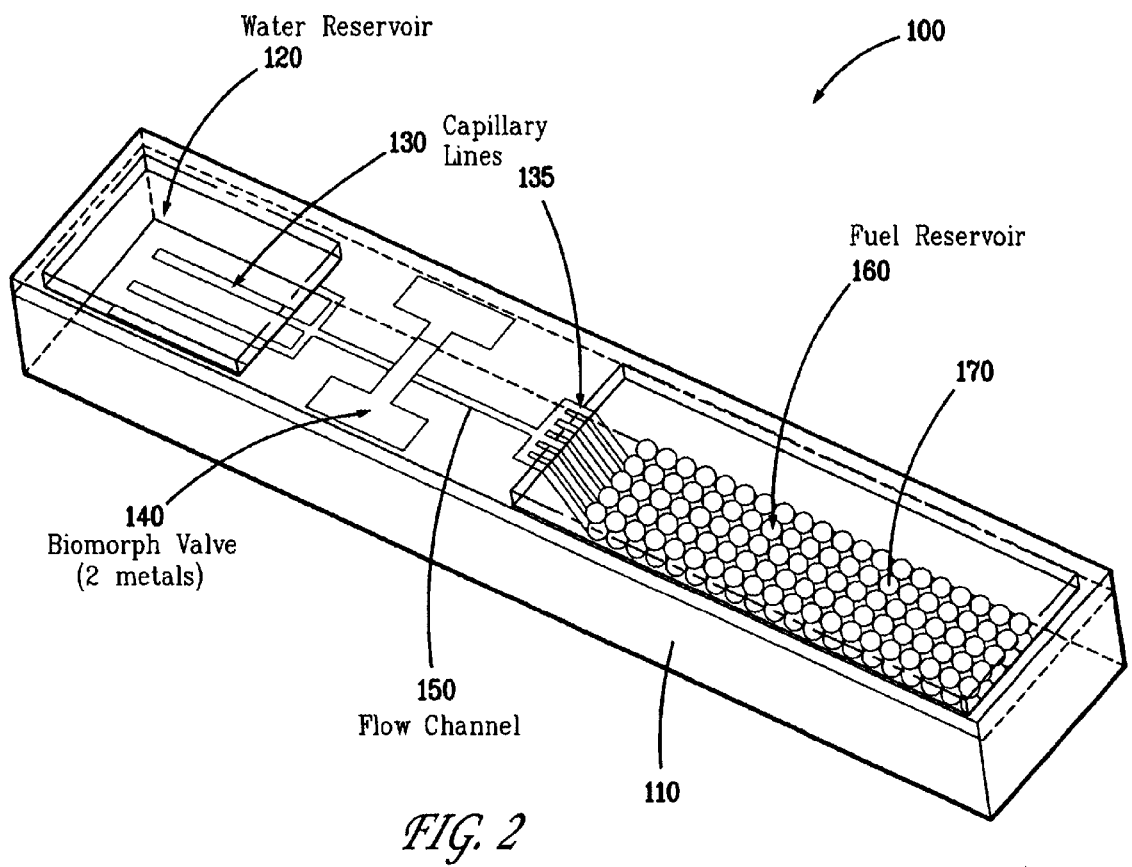
FIG. 2 shows a schematic isometric view of a micro hydrogen gas generator, according to the present invention.

FIG. 2 shows a schematic isometric view of an example of a micro hydrogen gas generator, according to the present invention. Gas generator 100 comprises a substantially planar substrate 110 with a pair of cavities (i.e., reservoirs) recessed into the substrate, i.e., water reservoir 120 and fuel reservoir 160. Flow channel 150 fluidically connects water reservoir 120 to fuel reservoir 160. A plurality of capillary lines 130 collect water from water reservoir 120 and feed water to the proximal end of flow channel 150. Then, capillary lines 135 located at the distal end of flow channel 150 distribute the water from flow channel 150 to a plurality of locations at the proximal end fuel reservoir 160. Fuel reservoir 160 holds a packed bed of micro-disperse fuel particles 170. Micro-disperse fuel particles 170 can comprise sodium borohydride with an incorporated catalyst. Micro-disperse fuel particles 170 can have a substantially uniform diameter from 1–10 microns, and, preferably, from about 3–5 microns. The catalyst can be cobalt, ruthenium, or nickel. Fuel particles 170 can be packed inside fuel reservoir 160 in the form of a hexagonal close-packed, a cubic array, or a network of aggregated particles having fractal dimensions. Because the dimensions of the open space in-between closely-packed fuel particles 170 is very small (i.e., less than 10 microns), capillary forces can pull (i.e., wick) water completely into fuel reservoir 160. Hence, no active pump is required to bring water from water reservoir 120 to fuel reservoir 160.

Valve 140 controls the flow of water from water reservoir 120 to fuel reservoir 160. The valve could be controlled by the current demands of the micro fuel cell. When the current demands are high, the flow of hydrogen must be high and the water valve would be fully open. At standby, the valve would be nearly closed, limiting the flow of water and the production of hydrogen.

A wide variety of designs can be used for valve 140. Valve 140 can be a MEMS structure fabricated using surface micromachining techniques. Valve 140 can be a normally-closed bimetallic or bimorph strip. Resistance heating or piezoelectric force (using electricity produced by an adjacent micro fuel cell) would activate and open the valve. Valve 140 in its normally-closed position would push on the top of a thin silicone membrane and restrict the flow of water in channel 150. This valve would use little energy from the micro fuel cell during hydrogen demand, and no energy at standby.

An alternative to the bimetallic/bimorph valve would be a normally-open valve, also with a thin top wall, and having a pressure chamber over the channel. This chamber could fill with hydrogen as the reaction proceeds. When hydrogen usage dropped, the chamber would pressurize and close the valve to the water supply. When hydrogen demand returns, the chamber pressure would drop and the valve would open allowing water to enter. This scheme uses no power, but does require a package and valve capable of holding pressurized hydrogen.

A solid cap or cover lid (not shown) can be sealed to the upper surface of substrate 110 to complete packaging of micro hydrogen gas generator 100. The cover lid can have openings for supplying water, and for removing hydrogen gas. The gas outlet openings may need to be smaller than the size of the fuel particles 170 so that fuel particles aren't carried out though the openings. Hence, the cover lid may need to be made with a large area having engineered porosity (i.e., a screen) to allow the hydrogen gas to pass through, without letting fuel particles escape. It is well-known in the art of surface micromachining to make uniform grids of pores (circles, squares, oblongs, etc.) in silicon, silicon nitride, even metals, using microlithography and etching techniques or femtosecond lasers, with engineered openings as small as 1 micron.

In a micro PEM fuel cell application, the Proton Exchange Membrane (PEM) can be in direct contact with (or with a small gap) the hydrogen gas evolving inside the fuel reservoir (i.e., the PEM becomes the cover lid over the fuel reservoir), so that the hydrogen gas doesn't need to be transported through pipes or channels to another location. Wastewater made by an integrated micro PEM fuel cell can be recycled through short microfluidic channels back to the water reservoir 120 for reuse and recycle.

It is important to note that the hydrogen gas generated by generator 100 has essentially 100% relative humidity (i.e., water vapor saturated), which is beneficial to the operation of a PEM fuel cell.

Substrate 110 should be made of a material that doesn't react with sodium borohydride, the catalyst, or the reaction products (hydrogen, sodium metaborate). Monocrystalline silicon, polysilicon, and silicon nitride can be used for substrate 110. Silicon surfaces can be coated with oxide where it needs to be hydrophilic, such as liquid channels 130, 135, and 150; while other areas can be hydrophobic. Reservoirs 120 and 160 can be manufactured by bulk micromachining methods. The overall dimensions of micro gas generator 100 can be, for example, 0.5 cm wide×2 cm long×400 microns deep. Capillary lines 130 and 135 can be about 20–100 microns wide and deep, sufficient to generate significant capillary forces. The cover lid can be made of a borosilicate glass (e.g., Pyrex™), which can be anodically bonded to a substrate made of silicon. About 1 cc of water can be stored on board in a collapsible container so it could be easily pumped out. The size of water reservoir 120 and fuel reservoir 160 can be easily scaled up or down to any size, consistent with the power requirements and fabrication limitations.

Optionally, fuel reservoir 160 can be filled with a two-component fuel mixture comprising micro-disperse particles of sodium borohydride and unincorporated particles of a suitable metal catalyst.

The interior volume of fuel reservoir 160 may need to be significantly oversized to allow for expansion of the packed fuel bed to prevent any swelling of the bed, and/or buildup of the reaction product sodium metaborate, from clogging up and choking off the flow of water through the bed.

FIG. 2 illustrates an example of a 13.8% compact, solid-state, micro hydrogen gas generator with a controllable valve, where the valve can be controlled by the current demands of an adjacent fuel cell. In particular, the design illustrated in FIG. 2 can be used in conjunction with the micro fuel cell described in co-pending U.S. patent application, "Fuel Cell and Membrane", Ser. No. 10/056,736 to Klitsner, et al., which is incorporated herein by reference.

Other embodiments of a micro hydrogen gas generator, like the example shown in FIG. 2, can be manufactured. For example, a MEMS micro-pump can be added to force water to flow from water reservoir 120 to fuel reservoir 160. However, the benefit of having greater flow and, hence, greater hydrogen production rate needs to be balanced against the energy required to power the pump.

Alternatively, the bimetallic/bimorph valve in the example shown in FIG. 2 can be eliminated. In this case, the addition of water into water reservoir 120 would initiate the chemical reaction, which would produce hydrogen gas in an essentially uncontrolled and continuous manner until either the source of water or fuel runs out. Such an application might have use in a one-time power source, such as for an emergency transmitter, where there is no demand or requirement for having control of the output from the micro fuel cell.

In another embodiment, with reference to the apparatus shown in FIG. 2, water reservoir 120 is filled with water comprising nanoparticles of the metal catalyst suspended therein. In this case, fuel particles 170 would not be required to have a metal catalyst incorporated therein. Methods to suspend nanoparticles in water are well-known in the art, and can include use of a polymer additive to stabilize the solution and prevent aggregation/coagulation.

The particular examples discussed above are cited to illustrate particular embodiments of the invention. Other applications and embodiments of the apparatus and method of the present invention will become evident to those skilled in the art.

The actual scope of the invention is defined by the claims appended hereto.

What is claimed is:

1. A compact hydrogen gas generator for using a compact solid source of hydrogen, comprising:
    a substantially planar substrate having an upper surface;
    a water-storage cavity recessed into the upper surface of the substrate;
    a fuel-storage cavity recessed into the upper surface of the substrate;
    a capillary flow channel for transporting water from the water-storage cavity to the fuel-storage cavity by capillary action;
    a cover lid, sealingly attached to the upper surface of the substrate, for sealing the two cavities and flow channel;
    outlet means for removing hydrogen gas produced during operation;
    a packed bed of micro-disperse particles of sodium borohydride disposed within the fuel storage cavity;
    and water contained within the water-storage cavity.

2. The hydrogen gas generator of claim 1, wherein the micro-disperse particles of sodium borohydride have a metal catalyst incorporated into the particles.

3. The hydrogen gas generator of claim 1, wherein the water comprises nanoparticles of a metal catalyst suspended therein.

4. The hydrogen gas generator of claim 1, further comprising a valve disposed in the capillary flow channel for controlling the flow of water from the water-storage cavity to the fuel-storage cavity, whereby the rate of hydrogen gas generation is controlled.

5. The hydrogen gas generator of claim 4, wherein the valve comprises a normally-closed MEMS valve activated by an actuator selected from the group consisting of bimetallic and bimorph actuators.

6. The hydrogen gas generator of claim 1, further comprising a pump for pumping water from the water-storage cavity to the fuel-storage cavity.

7. The hydrogen gas generator of claim 1, wherein the thickness of the substrate is less than or equal to 400 microns.

8. The hydrogen gas generator of claim 1, wherein the micro-disperse particles of sodium borohydride have a substantially uniform diameter from about 1 to about 10 microns.

9. The hydrogen gas generator of claim 1, wherein the substrate comprises a material selected from the group consisting of monocrystalline silicon, polysilicon, and silicon nitride.

10. The hydrogen gas generator of claim 1, wherein the substrate comprises silicon; the cover lid comprises a borosilicate glass; and the cover lid is anodically bonded to the substrate.

* * * * *